Dec. 27, 1966   A. KREI   3,293,785
ROAD MAP MOUNTING MEANS FOR AN AUTOMOBILE
Filed Sept. 18, 1964   2 Sheets-Sheet 1

INVENTOR.
Adalbert Krei
BY
Karman Karman & McCulloch
ATTORNEYS

Dec. 27, 1966    A. KREI    3,293,785
ROAD MAP MOUNTING MEANS FOR AN AUTOMOBILE
Filed Sept. 18, 1964    2 Sheets-Sheet 2
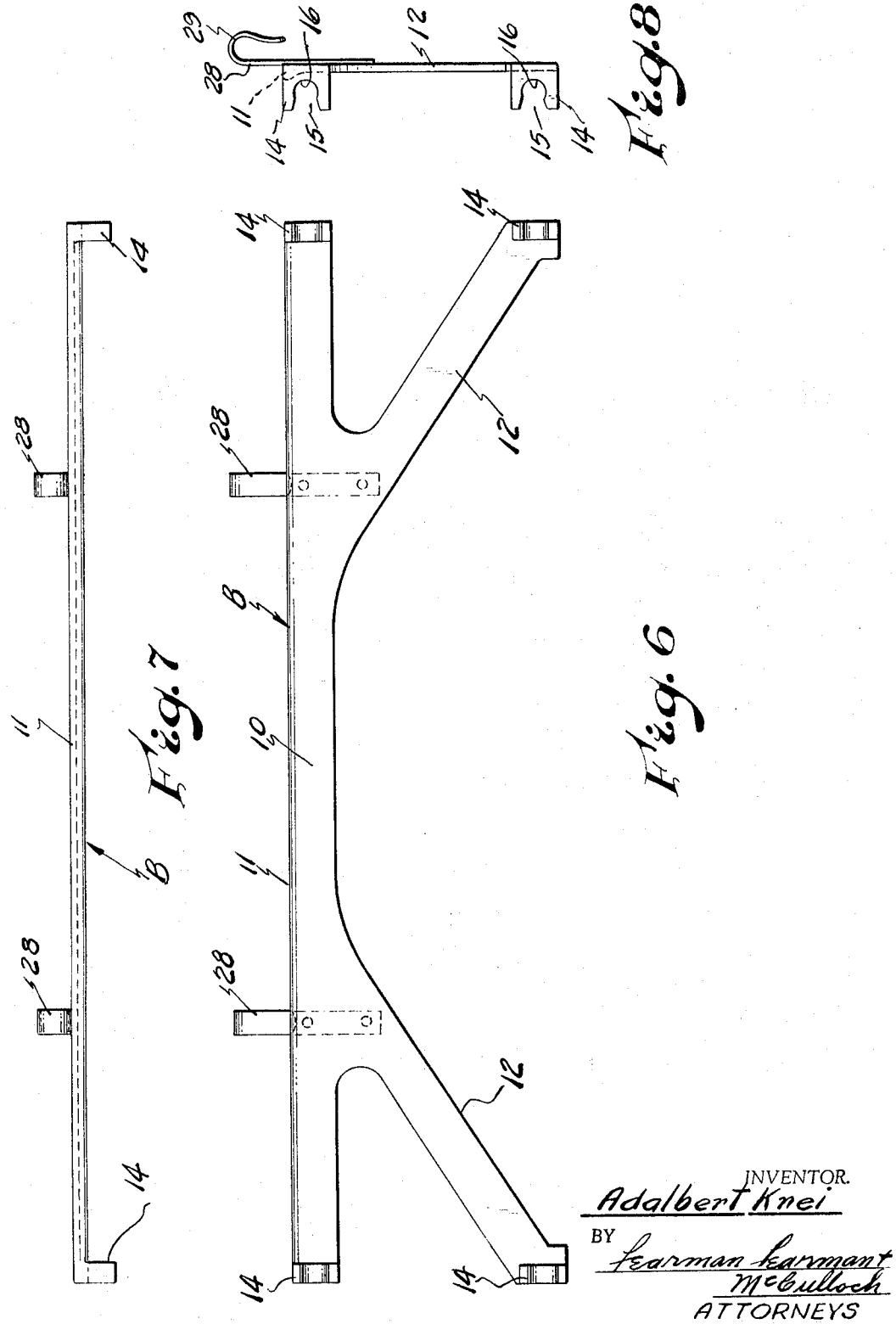
INVENTOR.
Adalbert Krei
BY
Fearman Fearmant
McCulloch
ATTORNEYS

United States Patent Office 3,293,785
Patented Dec. 27, 1966

3,293,785
ROAD MAP MOUNTING MEANS FOR AN
AUTOMOBILE
Adalbert Krei, 843 Boutell Road,
Essexville, Mich. 48732
Filed Sept. 18, 1964, Ser. No. 397,417
2 Claims. (Cl. 40—86)

This invention relates to map holders for attachment to conventional automobile sun visors and is so mounted that it can be readily grasped by and swing to positions so that it can be easily adjusted by the driver or other occupants to show the roads over which the vehicle is traveling and the other map indicia with relation thereto.

One of the prime objects of the invention is to design a very simple, practical and inexpensive road map holder which can be readily mounted on the vehicle's sun visor so that it is readily removable from or attachable thereto; which is universally adaptable for visors on all makes of cars, and on which the road maps can be readily mounted and/or removed.

Another object of the invention is to design a very inexpensive map holder formed of a minimum number of parts, all of which can be readily manufactured and assembled by inexperienced labor.

A further object is to provide means for easy mounting of the holder on the sun visor and on which the maps can be readily wound and secured, and provide means whereby the map can be easily actuated to expose that portion of the map in which the driver is interested.

Still a further object of the invention is to provide a map holder, the main frame and rollers of which can be formed of plastic, which insures quantity production at the lowest manufacturing cost, requires a minimum of assembly time, and which holder is swung with the sun visor when not in use or completely removed when desired.

With the above and other objects in view, the present invention consists in the combination and arrangement of parts, hereinafter more fully described, illustrated in the accompanying drawings, and more particularly pointed out in the appended claims; it being understood that changes may be made in the form, size, proportion and minor details of construction, without departing from the spirit, or sacrificing any of the advantages of the invention.

In the drawings:

FIG. 6 is a face elevational view of the main frame.

FIG. 7 is a plan view thereof, and

FIG. 8 is an end elevational view.

Figure 1:
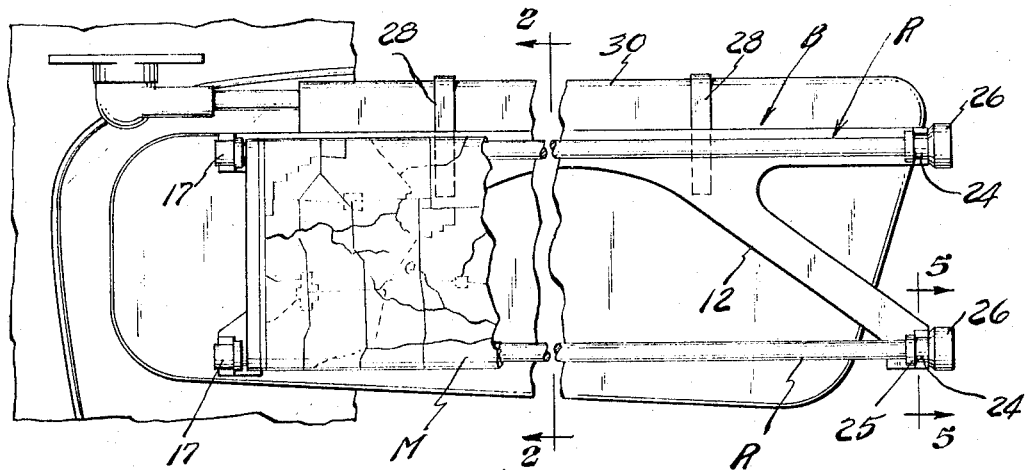
FIG. 1 is a face elevational view showing my map holder mounted in position on an automobile visor.
Figure 3:
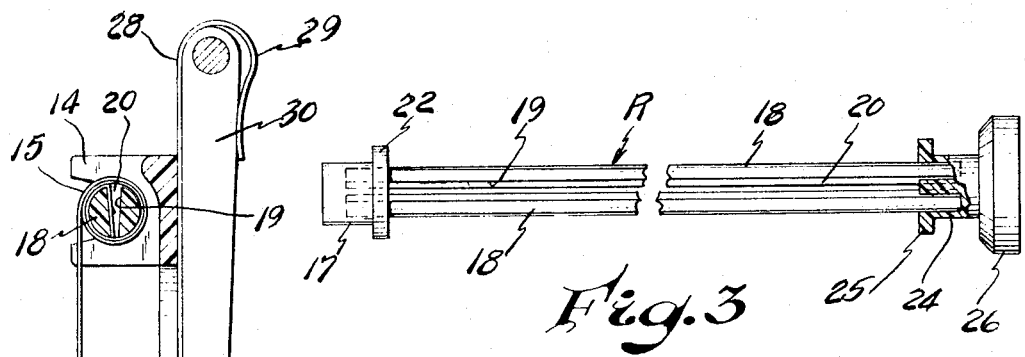
FIG. 3 is an elevational view of one of the rollers, with the bearings in position thereon.
Figure 2:
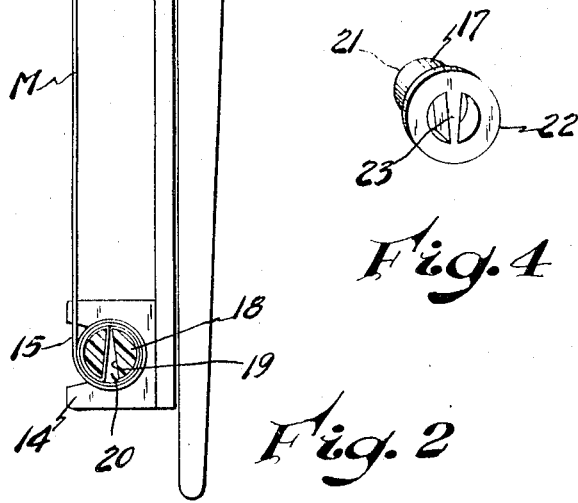
FIG. 2 is an enlarged transverse sectional view taken on the line 2—2 of FIG. 1.
Figure 4:
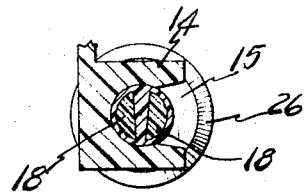
FIG. 4 is a perspective view of one of the end bearings.
Figure 5:
FIG. 5 is an enlarged sectional view taken on the line 5—5 of FIG 1.

Referring now more particularly to the drawings in which I have shown one embodiment of my invention;

The letter B indicates a preferably plastic frame comprising a top bar 10, the upper edge section of which is enlarged at 11, and diverging leg sections 12 are formed integral therewith, the bar section 10 and free ends of the legs 12 being formed with bearing seats 14 which can be molded therewith or fused in position, an open passage 15 is provided in the bearing seat and opens into a rounded section 16 which releasably accommodates a flanged end bearing 17 in which one end of the sectional roller R is mounted as clearly shown in FIGS. 1 and 2 of the drawings.

The rollers R are preferably formed of two elongated identical strips 18, the opposed flat face 19 of which are shaped to form, when assembled, a V-shaped passage 20 therebetween to facilitate threading one end of the map M into said passage, and then by winding the roller the map can be wound to desired length. The free end of the map is then secured to the other roller in identically the same manner as above described, and the proper turning knob is then actuated to roll the map so that the desired area is shown on the flat map section between the upper and lower roller.

The bearing member 17 is provided on one end of the roller R, the end 21 being hollow and cylindrical in shape and one end of the sectional roller is inserted therein, said bearing being formed with a flanged end 22, and a division wall 23 is provided as shown to properly space the roller sections from each other.

The opposite end of each roller is provided with a combination bearing 24 flanged as at 25, the opposite end terminating in an enlarged turning knob 26, the bearing section 24 being hollow and having a rib 27 therein for spacing the roller sections 18 as above described, so that it can be manually actuated by turning the knob 26.

The mounting of the map M is both simple and easy. Resilient clips 28 are secured to the back face of the bar 10 in spaced apart relation, the upper ends of the clips being rounded as at 29 for yieldable engagement with the upper end 30 of the sun visor, so that it can be readily mounted and/or removed as desired, said removal in no manner affecting the map, as the frame and map constitute a self-contained unit. This map holder in no manner affects operation of the sun visor, serving merely as a support for same. The holder can, of course, be stored in a pocket in the car when not in use.

From the foregoing description, it will be obvious that I have perfected a very simple, practical and inexpensive road map holder by means of which a driver may check and be guided by the highway shown on the map and the cities, without turning his head or taking his eyes from the roadway.

I claim:

1. A device of the character described comprising: in combination with a sun visor, a one-piece frame formed with diverging leg sections; bearing seats on the ends of the frame and legs, respectively; elongated sectional rollers revolvably mounted in said bearing seats and provided with a knob on one end of each roller, each roller being formed of opposed, spaced apart, elongated sections which, when assembled, provide an elongated, substantially V-shaped, slit therebetween to facilitate connection of a road map for rolling adjustment thereon; and ribs in said bearing seats to accommodate the ends of the spaced apart sections to space and secure them in position.

2. A device of the character described comprising: in combination with a sun visor, a one-piece frame formed with diverging leg sections; bearing seats on the ends of the frame and leg sections respectively; elongated sectional rollers revolvably mounted in said bearing seats and having a turning knob on one end of each roller; each roller having an elongated slit therein to facilitate connection of a road map for rolling adjustment thereon; and ribs in said bearing seats, said ribs being substantially V-shaped in cross-section to accommodate the ends of the spaced apart sections to space and secure them in position.

References Cited by the Examiner

UNITED STATES PATENTS

| | | | |
|---|---|---|---|
| 137,672 | 4/1873 | Garsed | 242—115 |
| 1,547,033 | 7/1925 | Crawford | 40—86 |
| 1,667,967 | 5/1928 | Crimmins | 40—86 |
| 2,306,634 | 12/1942 | MacDonald | 40—86 |
| 2,546,253 | 3/1951 | Beauregard | 242—115 X |
| 2,745,199 | 5/1956 | Kreinberg | 40—86 |
| 2,787,070 | 4/1957 | Idoine | 40—86 |

EUGENE R. CAPOZIO, *Primary Examiner.*

W. J. CONTRERAS, *Assistant Examiner.*